United States Patent
Cambou (10) Patent No.: US 11,303,460 B2
(45) Date of Patent: Apr. 12, 2022

(54) PUFS FROM SENSORS AND THEIR CALIBRATION

(71) Applicant: Arizona Board of Regents acting for and on behalf of Northern Arizona University, Flagstaff, AZ (US)

(72) Inventor: Bertrand Francis Cambou, Flagstaff, AZ (US)

(73) Assignee: ARIZONA BOARD OF REGENTS ON BEHALF OF NORTHERN ARIZONA UNIVERSITY, Flagstaff, AZ (US)

(*) Notice: Subject to any disclaimer, the term of this patent is extended or adjusted under 35 U.S.C. 154(b) by 159 days.

(21) Appl. No.: 15/635,822

(22) Filed: Jun. 28, 2017

(65) Prior Publication Data
US 2018/0006830 A1 Jan. 4, 2018

Related U.S. Application Data

(60) Provisional application No. 62/356,468, filed on Jun. 29, 2016.

(51) Int. Cl.
*H04L 9/32* (2006.01)
*G06F 11/22* (2006.01)
(Continued)

(52) U.S. Cl.
CPC ........ *H04L 9/3278* (2013.01); *G06F 11/2268* (2013.01); *G06F 12/1408* (2013.01); *G06F 21/00* (2013.01); *G06F 21/44* (2013.01); *G06F 21/73* (2013.01); *H04W 12/06* (2013.01); *G06F 2212/1052* (2013.01); *G06F 2221/2129* (2013.01); *H04L 63/1425* (2013.01); *H04W 84/18* (2013.01)

(58) Field of Classification Search
CPC ............... H04L 9/3278; H04L 63/1425; G06F 11/2268; G06F 12/1408; G06F 21/00;
(Continued)

(56) References Cited

U.S. PATENT DOCUMENTS 6,525,683 B1 * 2/2003 Gu .................. G09G 3/2014
341/138
8,516,269 B1 * 8/2013 Hamlet ................ G06F 21/445
340/5.8

(Continued)

*Primary Examiner* — Shewaye Gelagay
*Assistant Examiner* — Moeen Khan
(74) *Attorney, Agent, or Firm* — Quarles & Brady LLP (57) ABSTRACT

Several methods may be used to exploit the natural physical variations of sensors, to generate cryptographic physically unclonable functions (PUF) that may strengthen the cybersecurity of microelectronic systems. One method comprises extracting a stream of bits from the calibration table of each sensor to generate reference patterns, called PUF challenges, which can be stored in secure servers. The authentication of the sensor is positive when the data streams that are generated on demand, called PUF responses, match the challenges. To prevent a malicious party from generating responses, instructions may be added as part of the PUF challenges to define which parts of the calibration tables are to be used for response generation. Another method is based on differential sensors, one of them having the calibration module disconnected. The response to a physical or chemical signal of such a sensor may then be used to authenticate a specific pair of sensors.

13 Claims, 10 Drawing Sheets

(51) Int. Cl.
*G06F 12/14* (2006.01)
*G06F 21/00* (2013.01)
*G06F 21/44* (2013.01)
*G06F 21/73* (2013.01)
*H04W 12/06* (2021.01)
*H04W 84/18* (2009.01)
*H04L 29/06* (2006.01)

(58) Field of Classification Search
CPC .. G06F 21/44; G06F 21/73; G06F 2212/1052; G06F 2221/2129; H04W 12/06; H04W 84/18
USPC .......................................................... 713/193
See application file for complete search history.

(56) References Cited

U.S. PATENT DOCUMENTS

| | | | |
|---|---|---|---|
| 9,760,709 B2* | 9/2017 | Lu | H04L 9/0866 |
| 9,787,480 B2* | 10/2017 | Guo | H04L 63/08 |
| 2009/0083833 A1 | 3/2009 | Ziola et al. | |
| 2009/0282259 A1* | 11/2009 | Skoric | G06Q 20/40975 713/185 |
| 2010/0073147 A1* | 3/2010 | Guajardo Merchan | G06K 19/07309 340/10.51 |
| 2010/0127822 A1 | 5/2010 | Devadas | |
| 2010/0188062 A1* | 7/2010 | Candage | H02M 3/157 323/271 |
| 2012/0169487 A1 | 7/2012 | Poder | |
| 2013/0076531 A1* | 3/2013 | San Vicente | A61B 5/0026 340/870.02 |
| 2014/0226813 A1* | 8/2014 | Heffner | H04L 9/0866 380/44 |
| 2015/0195088 A1* | 7/2015 | Rostami | G09C 1/00 380/28 |
| 2015/0278527 A1* | 10/2015 | Falk | H04L 9/3278 726/25 |
| 2016/0330182 A1* | 11/2016 | Jeon | H04L 63/062 |
| 2016/0356820 A1* | 12/2016 | Ausserlechner | G01R 15/202 |
| 2017/0214532 A1* | 7/2017 | Das | G06F 21/73 |
| 2017/0230188 A1 | 8/2017 | Voutilainen | |

* cited by examiner

PUFS FROM SENSORS AND THEIR CALIBRATION

CROSS-REFERENCES TO RELATED APPLICATIONS

The present application claims priority from and benefit of U.S. Provisional Patent Application No. 62/356,468 filed on Jun. 29, 2016. The disclosure of the above-identified patent application is incorporated by reference herein in its entirety.

FIELD OF THE INVENTION

The present invention generally relates to cybersecurity and more specifically to creating and authenticating physically unclonable functions (PUFs) which may be a calibrated sensor or a pair of sensors.

BACKGROUND

Sensors convert physical and/or chemical signals into electric signals driving microelectronic systems. In order to generate electric signals that accurately represent the physical or chemical signals, calibration techniques have to compensate for the natural variations which are created during the manufacturing of the sensors.

Sensor based systems that are connected to the web are often vulnerable to cyber-attacks which could trigger life threatening conditions. Physically unclonable functions (PUF) can offer effective solutions to protect electronic systems from cyber-attacks. PUFs act as digital fingerprints leveraging the natural manufacturing variations that make otherwise identical circuit components slightly different from one another. These manufacturing variations allow cryptographic methods to be implemented on a network to enhance the trustworthiness of the authentication of systems in the network, and may prevent many cyber-attacks.

It would be desirable to have systems and methods for improving cybersecurity of sensor based systems using PUFs.

SUMMARY OF THE INVENTION

In this disclosure several methods are used to exploit the natural physical variations of sensors, to generate cryptographic physically unclonable functions (PUF) that are aimed at strengthening the cybersecurity of microelectronic systems.

The first architecture disclosed herein is based on the extraction of a stream of bits from the calibration table of each sensor to generate reference patterns, called PUF challenges, which can be stored in secure servers. The authentication of the sensor is positive when the data streams that are generated on demand, called PUF responses, match the challenges. To prevent a malicious party from generating responses, instructions can be added as part of the PUF challenges to define which parts of the calibration tables are to be used for response generation, and what additional responses can be generated by the embedded RAMs.

The second authentication architecture that is disclosed is based on differential sensors, one of them having the calibration module disconnected. The response to a physical or chemical signal from such a sensor can then be used to authenticate a specific pair of sensors.

The above features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Sensor devices are increasingly integrated into electronic systems such as mobile devices, Internet of things (IoT), cyber physical systems (CPS), smart grid, medical devices, and safety components. The range of physical and chemical parameters that are converted into usable electronic signals is extremely pervasive, and includes acceleration, rotation, deviation to the magnetic north, electronic currents, motion, image, chemical and biochemical elements, blood composition, heart beat rate, temperature, pressure, mechanical stress, humidity, and many others.

Due to manufacturing variations, two given individual sensors of the same type will generally have a different response even if the sensors were fabricated using the same process. In order to account for these differences, sensors are calibrated to ensure the off-the-shelf uniformity of sensor performance. One method of calibration involves performing preliminary calibration of a sensor during manufacture of the sensor and storing associated calibration data in a calibration table. The calibration data is applied to the output signals of the sensor in order to standardize the sensor output signals (e.g., the sensor response) and to ensure the accuracy of the sensor. In this way, the manufacturing variations of individual sensors and their effects on the responses of these sensors are accounted for.

The manufacturing variations that occur in sensors make sensors ideal candidates for use in physically unclonable function (PUF) based security and identification systems. A PUF is a physical entity that is relatively easy to make and evaluate, but that is highly impractical to duplicate due to its unpredictable but repeatable response to physical stimulus. In the case of sensors, the intrinsic randomness of the manufacturing variations of a given sensor can be used as the basis for a PUF. Because the calibration table for a sensor takes on the intrinsic randomness of the manufacturing variations of the sensor, PUF-based verification of a system can be performed using just the data stored in the calibration table. This verification takes place without needing to actually apply a detectable stimulus (e.g., physical or chemical stimulus) to the sensor, which greatly simplifies PUF-based system verification over other methods that require a known detectable stimulus (e.g., physical or chemical stimulus) to be applied to the sensor being verified.

Alternatively, systems can be designed having two sensors of the same type, one calibrated and the other uncalibrated, and differences between the outputs of the calibrated sensor and of the uncalibrated sensor may be compared (e.g., using exclusive-OR logic circuitry) to generate data that can be used as the basis for a PUF. This type of two-sensor system is referred to herein as a "differential sensor system." For differential sensor systems, a physical or chemical signal does need to be applied to the sensors during PUF-based verification. However the physical or chemical stimulus applied during PUF-based verification of the differential sensor system does not have to be a known quantity, which is advantageous over alternative methods of PUF-based verification that require a known physical or chemical stimulus to be applied to the sensor being verified.

Figure 1:
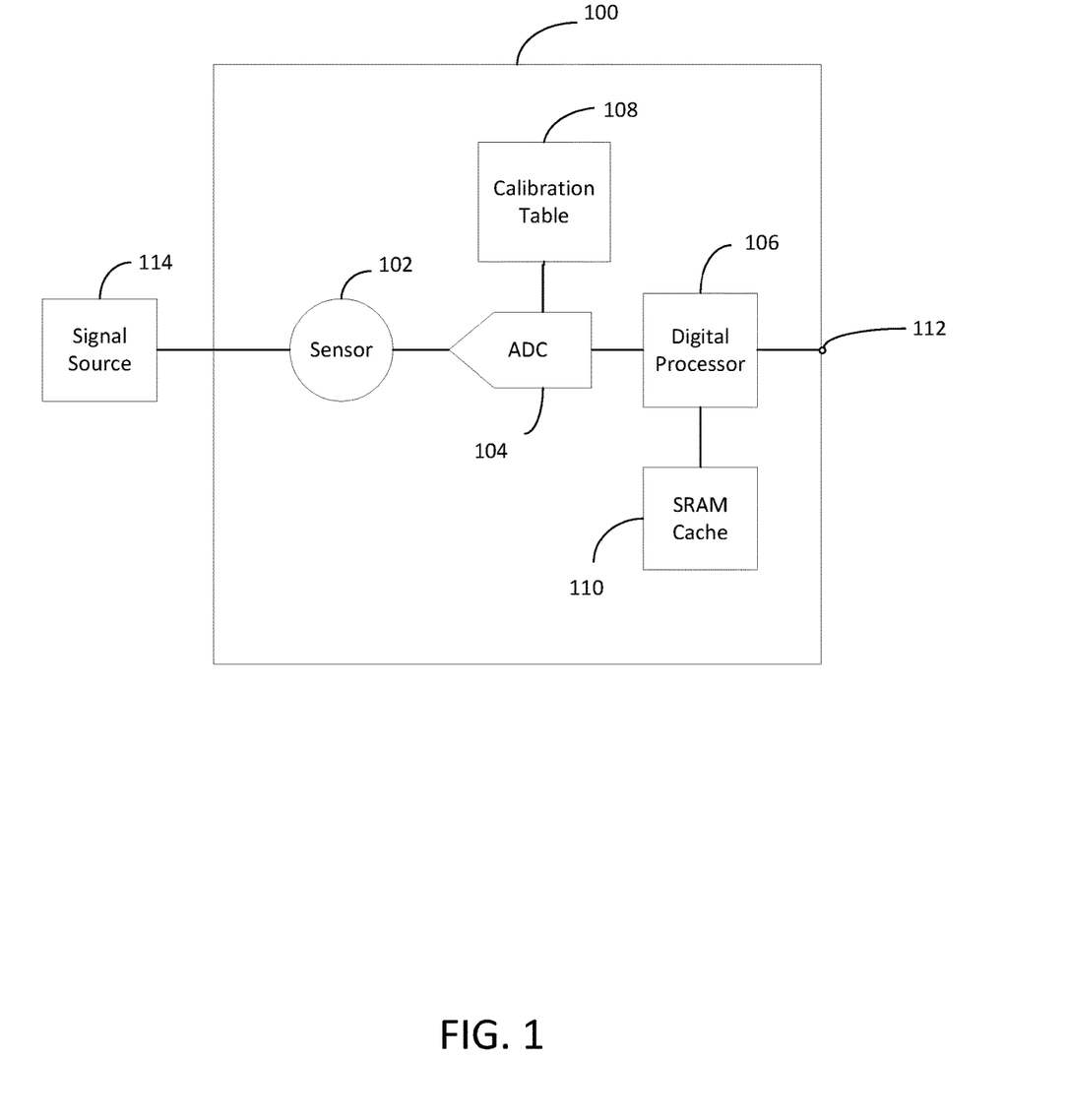
FIG. 1 is a block diagram of a sensor system.

FIG. 1 shows a sensor system 100 that includes a sensor 102, an analog-to-digital converter (ADC) 104, a digital processor 106 having an output 112, a static random access memory (SRAM) cache 110, and a calibration table 108. A signal source 114 is coupled to the sensor system 100 at an input of the sensor 102. The signal source produces a detectable (e.g., physical or chemical) signal that is sensed by the sensor 102. The sensor 102 generates an electrical analog signal corresponding to the detectable signal and provides this analog signal to the ADC 104, effectively transforming the detectable signal into an electrical analog signal. The ADC 104 converts the analog signal generated by the sensor 102 into a digital signal, which is provided to the digital processor 106. The digital processor 106 then provides the digital signal to an external system through output 112. The SRAM cache 110 includes multiple flip-flop based cells and may be used to reduce the average cost of accessing data in non-volatile memory of the sensor system 100 by the digital processor 106. For example, the SRAM cache 110 may store copies of data from frequently used locations in the non-volatile memory.

Sensor systems such as the sensor system 100 need to be calibrated with known detectable (e.g., physical or chemical) signals that produce known (i.e., expected) electrical signals when processed by a sensor such as the sensor 102. Possible calibrations may include determining a reset position (i.e. obtaining a zero as an output signal when no detectable signal parameter is sensed) to correct deviations for accurate reading, and to enhance the linearity of the electric signal. Other corrections that may be part of the calibration process include adjusting temperature coefficients, biasing conditions, and cancelling background noise. The calibration table 108 stored in a non-volatile memory may contain calibration data that is applied to the analog signal at the ADC 104 in order to calibrate the analog signal.

Figure 2:
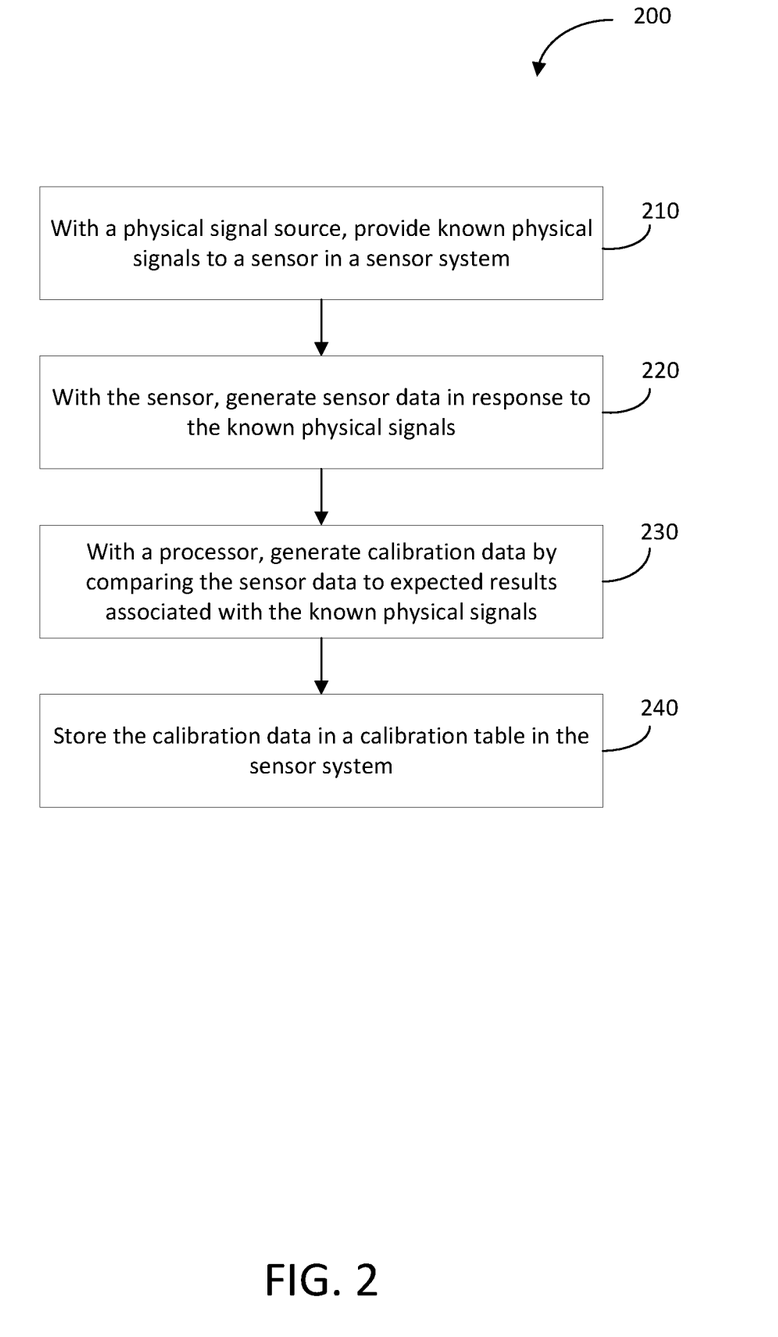
FIG. 2 illustrates the calibration of a sensor system.

An illustrative method 200 for populating a calibration table in a sensor system, such as the calibration table 108 in system 100, is shown in FIG. 2. At 210, a signal source provides known detectable (e.g., physical or chemical) signals to a sensor in a sensor system. When these known detectable signals are processed by an ideal sensor, the ideal sensor may generate expected results that are known to correspond to the known detectable signals. These expected results are used as a basis for calibration of the sensor in the sensor system, which is assumed to be non-ideal.

At 220, the sensor generates sensor data in response to the known detectable signals. The sensor data may be generated in the form of analog signals, which may be subsequently converted to digital signals for processing.

At 230, a processor generates calibration data by comparing the sensor data to the expected results associated with the known detectable signals. The processor may be a digital processor in the sensor system or, if desired, may be external to the sensor system. The calibration data may be any desired set of data that, when applied to the sensor data output by the non-ideal sensor, produces an expected result (i.e., ideal result) for a given detectable (e.g., physical or chemical) signal input of the sensor system. In some instances the calibration data may only produce an approximation of the expected result for the given detectable signal due to limitations on the size of the calibration data or on the processing power/speed required to perform adjustments using the calibration data.

At 240, the calibration data is stored in a calibration table in non-volatile memory of the sensor system. The calibration data stored in the calibration table may be, for example, a bit stream, which may be logically combined (e.g., using the logic functions AND, OR, NOR, NAND, XOR, etc.) with the sensor data in order to produce expected results or approximations of expected results for one or more detectable (e.g., physical or chemical) signals received by the sensor system.

Figure 3:
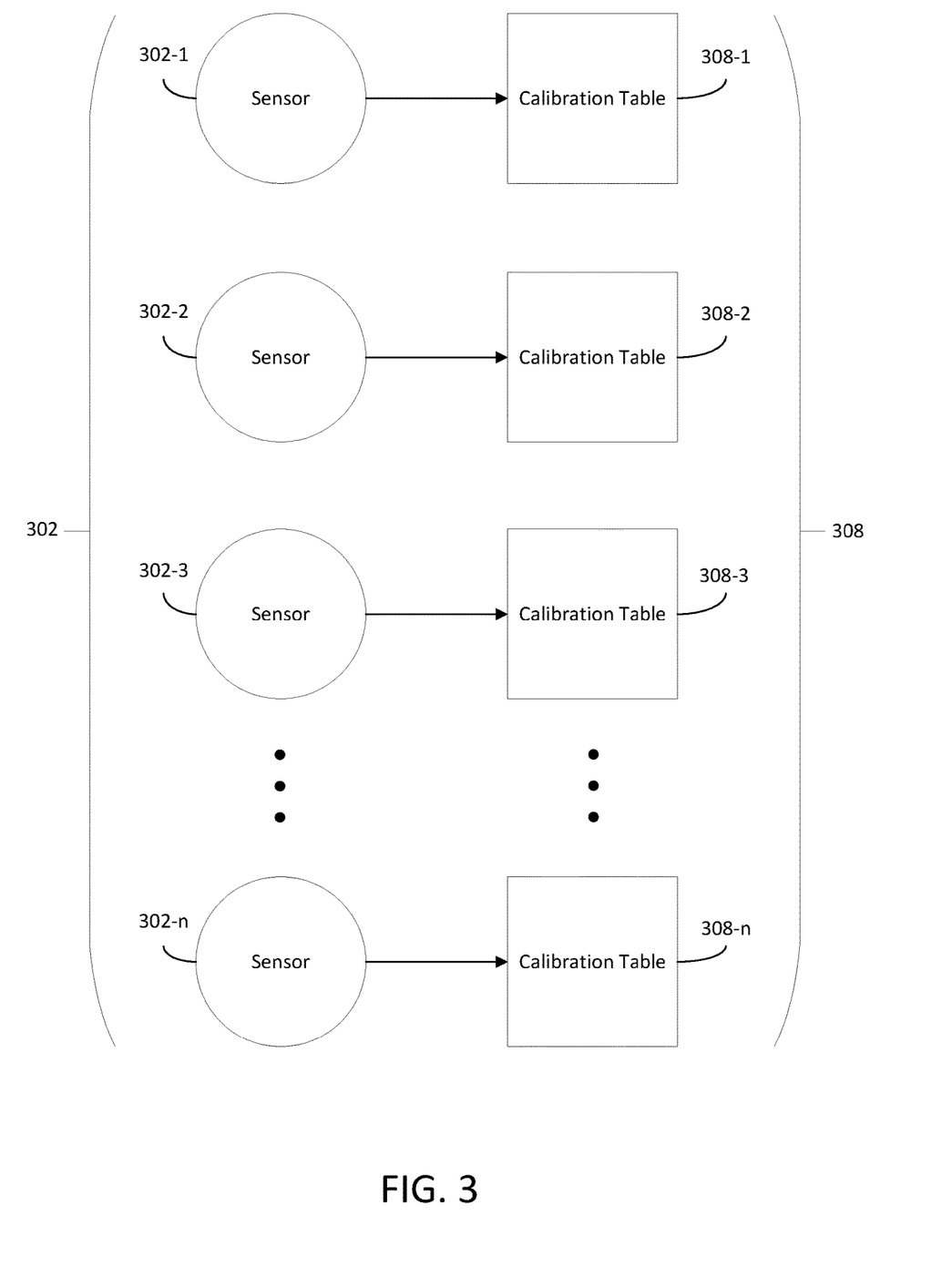
FIG. 3 is a block diagram of a set of sensors and calibration tables.

FIG. 3 shows an illustrative example of multiple sensors 302 having respective corresponding calibration tables 308. The sensors 302 may each be the same type of sensor and may have each been fabricated using the same manufacturing process. Despite these similarities, each of the sensors 302 will likely have a different response profile compared to each of the other sensors in the sensors 302. For example, the sensor 302-1 may have a response to a set of detected physical or chemical signals that is different from the response of each of sensors 302-2, 302-3 and 302-$n$ to the same set of detected physical or chemical signals. Any differences between individual response profiles of the sensors 302 result from manufacturing variations that cause the sensors 302 to have respectively different physical and/or electrical characteristics. There is no guarantee that two distinct sensors have distinct response profiles, however the natural randomness introduced by the manufacturing variations makes it unlikely for the response profiles of two distinct sensors to match exactly.

The calibration tables 308 each store calibration data for corresponding sensors 302 (e.g., according to the method shown in FIG. 2). Because of the high likelihood of differences in response profiles of the sensors 302, the calibration data stored in each of the calibration tables 308 is likely different from the calibration data stored in each other calibration table of the calibration tables 308. For example, the calibration data stored in calibration table 308-1 is likely different from the calibration data stored in any of calibration tables 308-2, 308-3, and 308-n, due to likely differences between the response profiles of sensors 302. Because of the natural randomness introduced to the calibration data of the calibration tables 308 by the manufacturing variations of the sensors 302, the calibration data for a given calibration table can be used for secure authentication and identification of the system in which the given calibration table is stored (e.g., by using the calibration data as the basis for a PUF).

Figure 4:
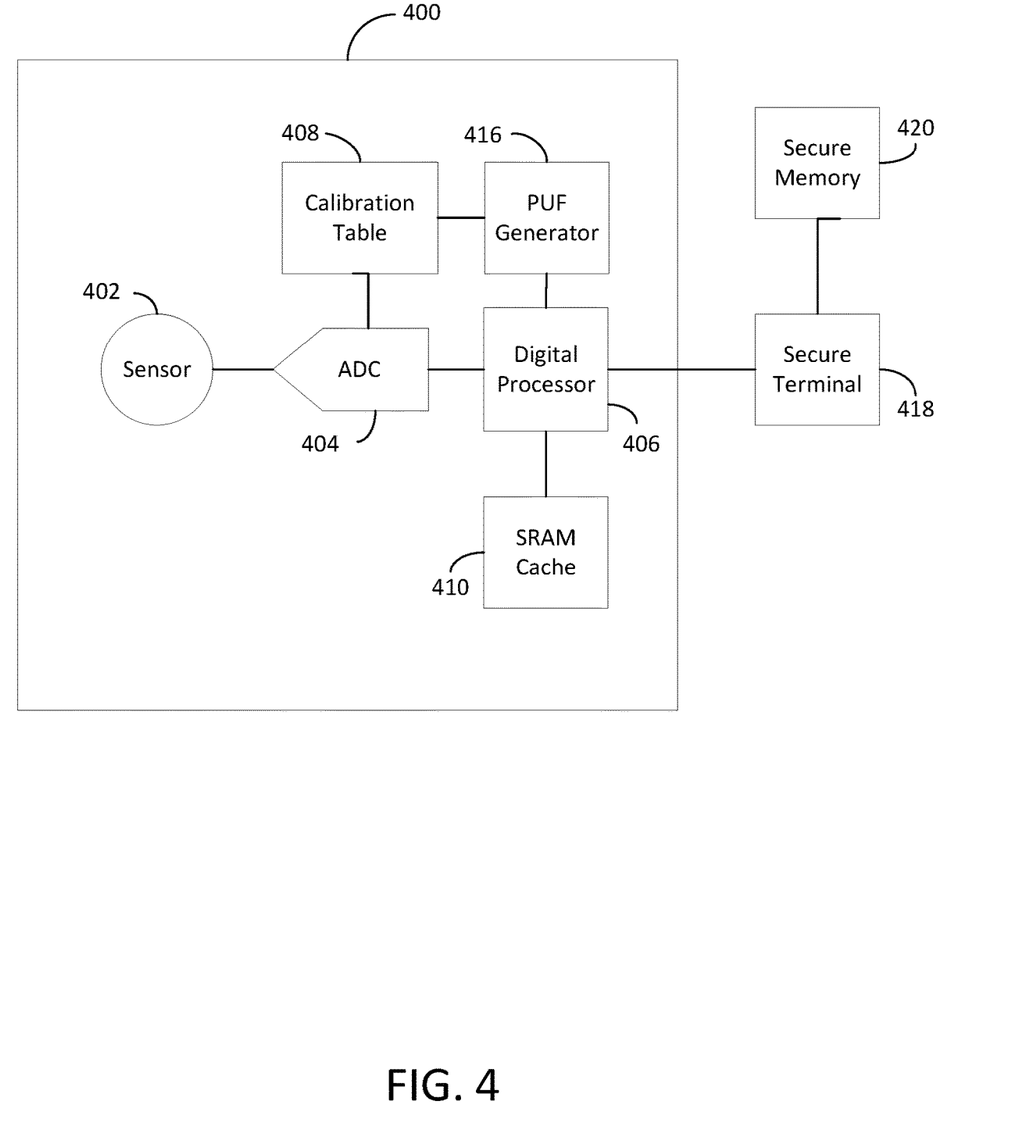
FIG. 4 is a block diagram of a sensor system with a PUF generator that is connected to a secure terminal.

FIG. 4 shows an illustrative sensor system 400 that can be authenticated using calibration table based PUF challenge-response pairs (CRPs) alone or in combination with SRAM based PUF CRPs. The sensor system 400 includes a sensor 402, an ADC 404, a digital processor 406, a calibration able 408, a SRAM cache 410, and a PUF generator 416. The PUF generator 416 is connected to both the digital processor 406 and the calibration table 408. The sensor system 400 is connected to a secure terminal 418 which is connected to a secure memory 420. While secure terminal 418 is shown here as being separate from secure memory 420, it should be noted that secure memory 420 may be implemented as part of secure terminal 418 if desired.

The term "secure terminal" used herein refers to a device (e.g., computer hardware) connected to a computer network that uses PUF verification (e.g., PUF verification performed using sensor system 400 or any other sensor-based PUF verification) as part of a cryptographic protocol used between the secure terminal and the computer network. For example, the secure terminal may use the sensor-based PUF described above as a basis for tamper sensitive key storage, system identification, oblivious transfer, bit commitment, key exchange, or any other desired cryptographic protocol.

Many of the basic attributes and functions of the sensor system 400 have already been described above in connection with the sensor system 100 of FIG. 1 and are not repeated here for the sake of brevity.

The underlying mechanism of PUF authentication is the creation of a large number of Challenge (i.e. Input) Response (i.e. output) Pairs (called CRPs) which are unique to each device. Once deployed during the authentication cycles, the PUFs are queried with challenges. The authentication is granted when the rate of matching CRPs is statistically high enough.

A PUF challenge is an expected (e.g., correct) PUF response that is obtained when setting up the initial cryptographic protocol for a system. The PUF challenge is the standard to which generated PUF responses are compared during authentication.

For instances in which the sensor system 400 is configured as a single-PUF system that uses only data from the calibration table 408 as a basis for PUF CRP generation, the PUF generator 416 initially generates one or more PUF challenges using the bit stream of calibration data stored in the calibration table 408. The PUF challenges may be extracted from some or all of the bit stream of the calibration table 408 in any desired order or pattern, not just in the sequential order in which the bit stream is arranged in the calibration table 408. Non-sequential extraction of the bit stream may further obscure the authorization process, thereby increasing security of the sensor system 400. The PUF challenges are then transferred to the secure terminal 418 and is stored in the secure memory 420 to be used for future authentication of the sensor system 400. Instructions for generating PUF responses are also stored in the secure memory 420. These instructions indicate the order or pattern according to which some or all of the bit stream should be extracted when generating a PUF response to authenticate the sensor system 400. This increases the level of security in case a hacker finds a way through side channel attacks to read the calibration table. With lack of instructions, the hacker faces the difficulty of finding out where to read the responses within the calibration tables, which becomes difficult when the size of the non-volatile memories storing the calibration table is large enough.

During authentication of the sensor system 400, the secure terminal 418 retrieves PUF challenge data from the secure memory 420. The PUF challenge data includes both the instructions for PUF response generation and the PUF challenges that were initially generated while setting up the initial cryptographic protocol for the sensor system 400. The instructions are sent to the PUF generator 416, which then extracts one or more PUF responses from the calibration table 408 based on the instructions. The PUF generator 416 sends the PUF responses to the secure terminal 418, which compares the PUF responses to the PUF challenges in order to determine if the CPRs match. If the rate of matching responses is statistically high enough (e.g., above a predetermined threshold), the sensor system 400 is determined to be authentic.

In order to increase the entropy (e.g., the number of possible combinations) in the authentication process of the sensor system 400, a multi-PUF architecture may be used that uses both the calibration table 408 and the SRAM cache 410 as sources for PUF challenges and PUF responses, rather than the single PUF architecture described above, which only uses the calibration table 408.

Each SRAM cell in the SRAM cache 410 is a flip flop that has, in theory, an equal opportunity to be a zero or a one when powered up. However, due to small asymmetries created during manufacturing, one side is usually preferred. The array of SRAM cells in SRAM cache will then have a preferred response when powered which is exploited to generate PUF challenge-response pairs.

For instances in which the sensor system 400 is configured as a multi-PUF system, the PUF generator 416 initially generates one or more PUF challenges using the bit stream of calibration data stored in the calibration table 408 and generates additional PUF challenges using the power-up state of SRAM cells in the SRAM cache 410. The calibration table based PUF challenges may be extracted from some or all of the bit stream of the calibration table 408 in any desired order or pattern, not just in the sequential order in which the bit stream is arranged in the calibration table 408. The SRAM based and calibration table based PUF challenges are then transferred to the secure terminal 418 and is stored in the secure memory 420 to be used for future authentication of the sensor system 400. Instructions for generating PUF responses are also stored in the secure memory 420. These instructions indicate the order or pattern according to which some or all of the bit stream should be extracted when generating a PUF response to authenticate the sensor system 400.

During multi-PUF authentication of the sensor system 400, the secure terminal 418 retrieves PUF challenge data from the secure memory 420. The PUF challenge data includes the instructions for PUF response generation, and the PUF challenges that were initially generated while setting up the initial cryptographic protocol for the sensor system 400. The instructions are sent to the PUF generator 416, which then extracts PUF responses from the calibration table 408 based on the instructions and extracts PUF responses from the SRAM cache 410. The PUF generator 416 sends all of the extracted PUF responses to the secure terminal 418, which compares the PUF responses to the corresponding PUF challenges in order to determine if the CPRs match. If the rate of matching responses is statistically high enough (e.g., above a predetermined threshold), the sensor system 400 is determined to be authentic.

The use of the SRAM based PUF to strengthen the level of security, is given only as an example as other PUFs can be generated from sensor systems such as PUF generated from sensor PUFs, ring oscillators, gate delays, or non-volatile memories.

Figure 5:
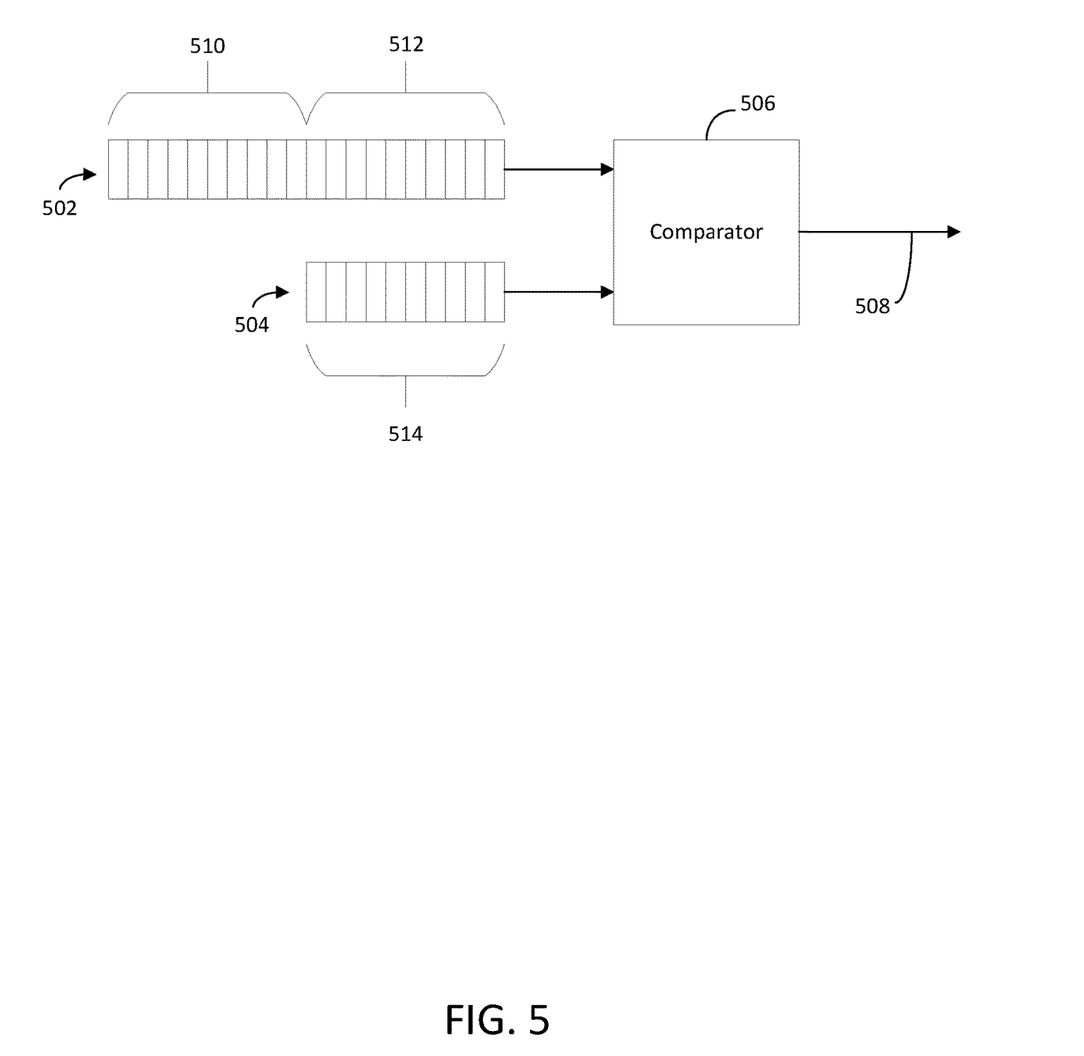
FIG. 5 illustrates PUF challenge-response pair matching for a calibration table PUF.

FIG. 5 shows how PUF CRPs for single-PUF systems of the type described in connection with FIG. 4 may be compared (e.g., at the secure terminal 418 shown in FIG. 4) to determine if they match. PUF challenge data 502 includes instructions 510 and calibration table based PUF challenges 512. PUF response data 504 includes PUF responses 514 that are generated according to instructions 510 (e.g., at PUF generator 416). The PUF challenges 512 and the PUF responses 514 are fed into comparator 506 as CRPs. The comparator 506 then determines whether each CRP matches and produces a corresponding output signal at output 508. It should be noted that the CRPs may be compared using any desired practical means and that the use of the comparator 506 shown here is merely illustrative.

It should also be noted that the two sections 510 and 512 of the PUF challenge data 502 do not have to be nicely ordered in a serial way. For example the data stream can be mixed with random numbers and then decrypted for response generation.

Figure 6:
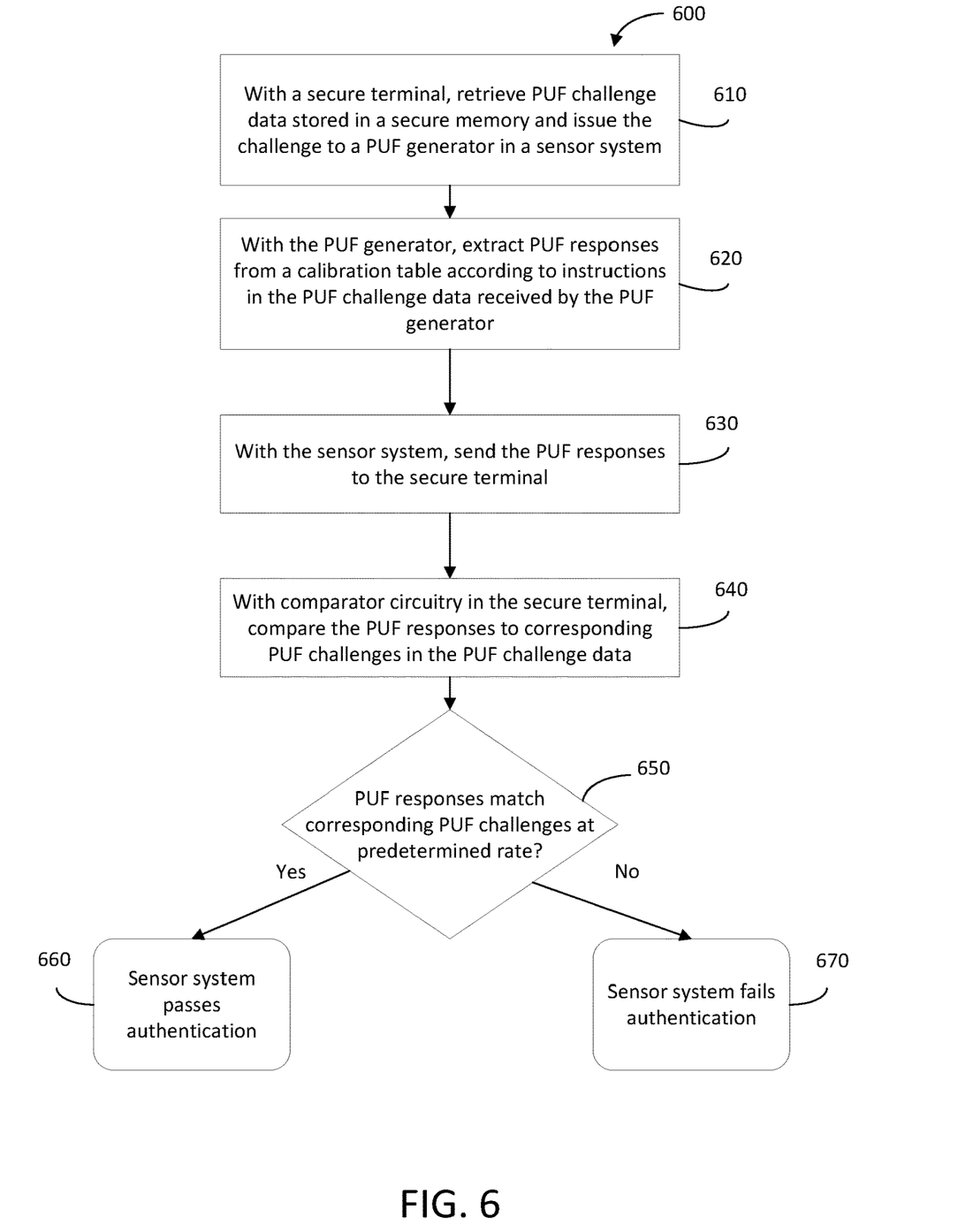
FIG. 6 illustrates a method of PUF challenge-response pair matching for a calibration table PUF.

FIG. 6 shows an illustrative method 600 for performing authentication of a sensor system (e.g., sensor system 400 shown in FIG. 4) having a single-PUF architecture. At 610, a secure terminal retrieves PUF challenge data stored in a secure memory and issues the challenge to a PUF generator in a sensor system. The PUF challenge data may be generated and stored during setup of the initial cryptographic protocol of the system.

At 620, the PUF generator extracts PUF responses from a calibration table in the sensor system according to instructions in the PUF challenge data that was received by the PUF generator from the secure terminal at 610. If desired, the PUF responses may be generated based on only a portion of the calibration data stored in the calibration table and/or the calibration data used to generate the PUF responses may be read non-sequentially according to an order defined in the instructions.

At 630, the sensor system sends the PUF responses to the secure terminal. In order to hide the PUF responses from potential hackers, a hash function with random numbers may be used to encrypt the transmitted responses.

At 640, comparator circuitry in the secure terminal compares the PUF responses to corresponding PUF challenges in the PUF challenge data. If desired, the comparator circuitry may include digital logic circuitry, such as XOR logic gates.

At 650, the secure terminal determines whether the PUF responses match the corresponding PUF challenges at a predetermined rate based on, for example, the output of XOR logic gates in the comparator circuitry. This determination may be made by processing circuitry in the secure terminal that compares the number of PUF CRP matches over time to the predetermined matching rate. The predetermined matching rate may be defined during setup of the initial cryptographic protocol of the system.

At 660, if the PUF responses match the corresponding PUF challenges at or above the predetermined rate, the sensor system passes authentication.

At 670, if the PUF responses match the corresponding PUF challenges below the predetermined rate, the sensor system fails authentication.

Figure 7:
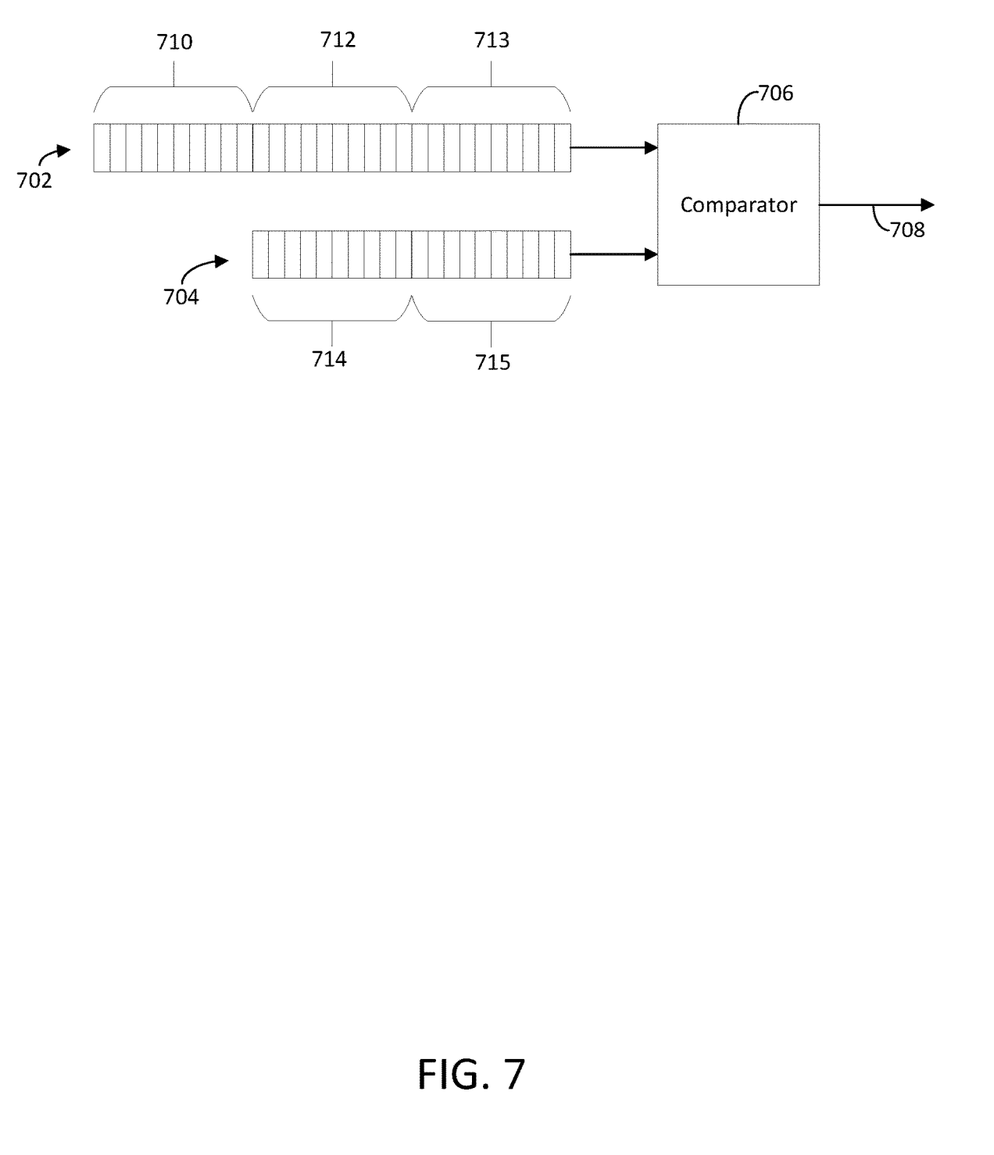
FIG. 7 illustrates PUF challenge-response pair matching in for a calibration table PUF and a SRAM PUF in a multi-PUF system.

FIG. 7 shows how PUF CRPs for multi-PUF systems of the type described in connection with FIG. 4 may be compared (e.g., at the secure terminal 418 shown in FIG. 4) to determine if they match. PUF challenge data 702 includes instructions 710, calibration table based PUF challenges 712, and SRAM based PUF challenges 713. The PUF response data 704 includes SRAM based PUF responses and the calibration table based PUF responses 714 that are generated according to the instructions 510 (e.g., at PUF generator 416). The PUF challenges 712 and 713 and the PUF responses 714 and 715 are fed into the comparator 506 as CRPs. The comparator 706 then determines whether each CRP matches and produces a corresponding output signal at output 708. It should be noted that the CRPs may be compared using any desired practical means and that the use of the comparator 706 shown here is merely illustrative.

It should also be noted that the three sections 710, 712, and 713 of the PUF challenge data 702 do not have to be nicely ordered in a serial way. For example the data stream can be mixed with random numbers and then decrypted for response generation.

Figure 8:
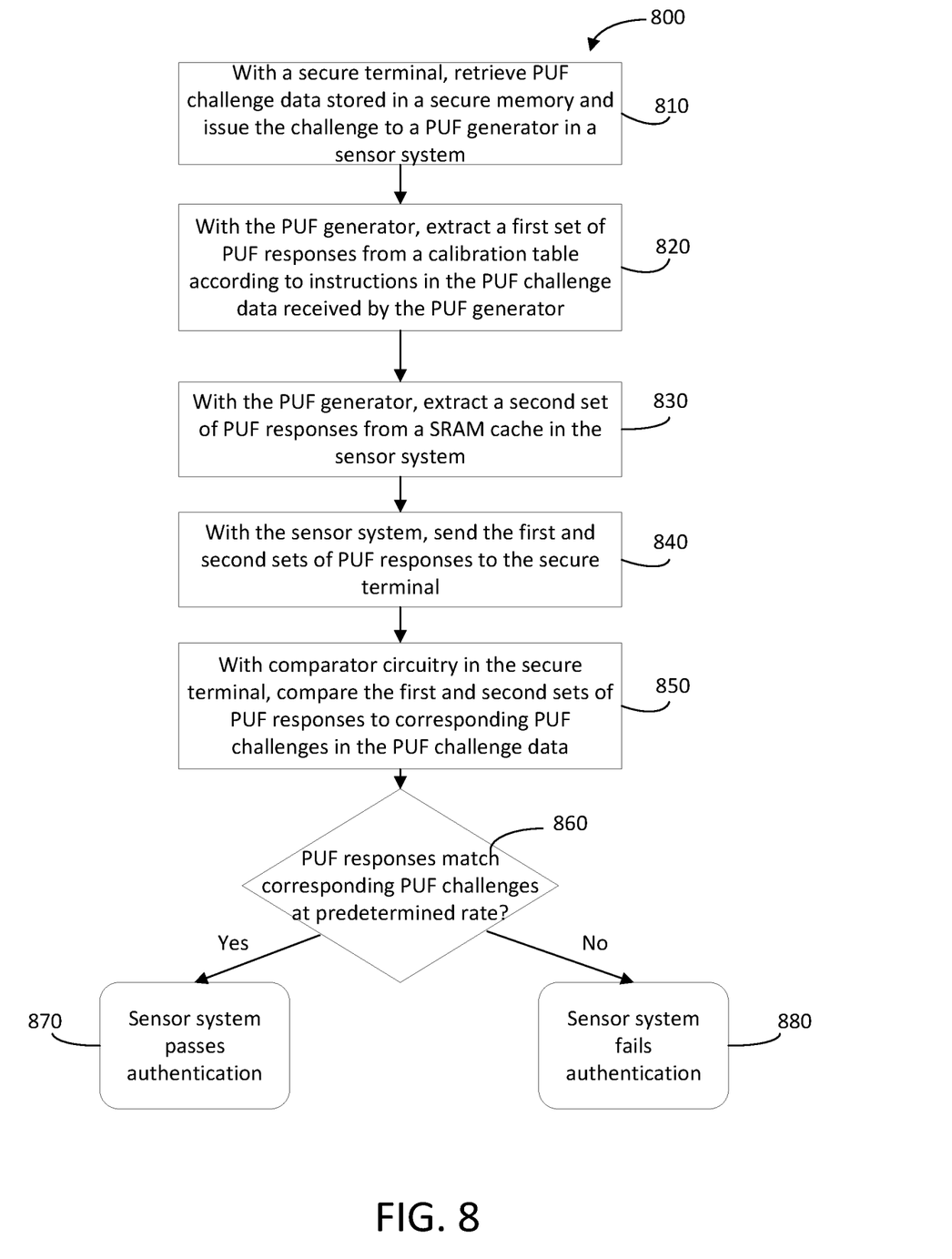
FIG. 8 illustrates a method of PUF challenge-response pair matching for a calibration table PUF and a SRAM PUF in a multi-PUF system.

FIG. 8 shows an illustrative method 800 for performing authentication of a sensor system (e.g., the sensor system 400 shown in FIG. 4) having a multi-PUF architecture. At 810, a secure terminal retrieves PUF challenge data stored in a secure memory and issues the challenge to a PUF generator in a sensor system. The PUF challenge data may be generated and stored during setup of the initial cryptographic protocol of the system.

At 820, the PUF generator extracts a first set of PUF responses from a calibration table in the sensor system according to instructions in the PUF challenge data that was received by the PUF generator from the secure terminal at 610. If desired, the PUF responses may be generated based on only a portion of the calibration data stored in the calibration table and/or the calibration data used to generate the PUF responses may be read non-sequentially according to an order defined in the instructions.

At 830, the PUF generator extracts a second set of PUF responses from a SRAM cache in the sensor system. For example, this SRAM based PUF response may be generated based on the ratio of SRAM cells in an "ON state" to SRAM cells in an "OFF state" when SRAM cells in the SRAM cache are woken up (e.g., directly after the powering on the SRAM cache). In particular, the "ON state" corresponds to an SRAM cell being held at a logic "1", whereas the "OFF state" corresponds to an SRAM cell being held at a logic "0".

At 840, the sensor system sends the first and second sets of PUF responses to the secure terminal. In order to hide the PUF responses from potential hackers, a hash function with random numbers may be used to encrypt the transmitted responses.

At 850, comparator circuitry in the secure terminal compares the first and second sets of PUF responses to corresponding PUF challenges in the PUF challenge data. If desired, the comparator circuitry may include digital logic circuitry, such as XOR logic gates.

At 860, the secure terminal determines whether the first and second sets of PUF responses match the corresponding PUF challenges at a predetermined rate based on, for example, the output of XOR logic gates in the comparator circuitry. This determination may be made by processing circuitry in the secure terminal that compares the number of PUF CRP matches over time to the predetermined matching rate. The predetermined matching rate may be defined during setup of the initial cryptographic protocol of the system.

At 870, if the first and second sets of PUF responses match the corresponding PUF challenges at or above the predetermined rate, the sensor system passes authentication.

At 880, if the first and second sets of PUF responses match the corresponding PUF challenges below the predetermined rate, the sensor system fails authentication.

Figure 9:
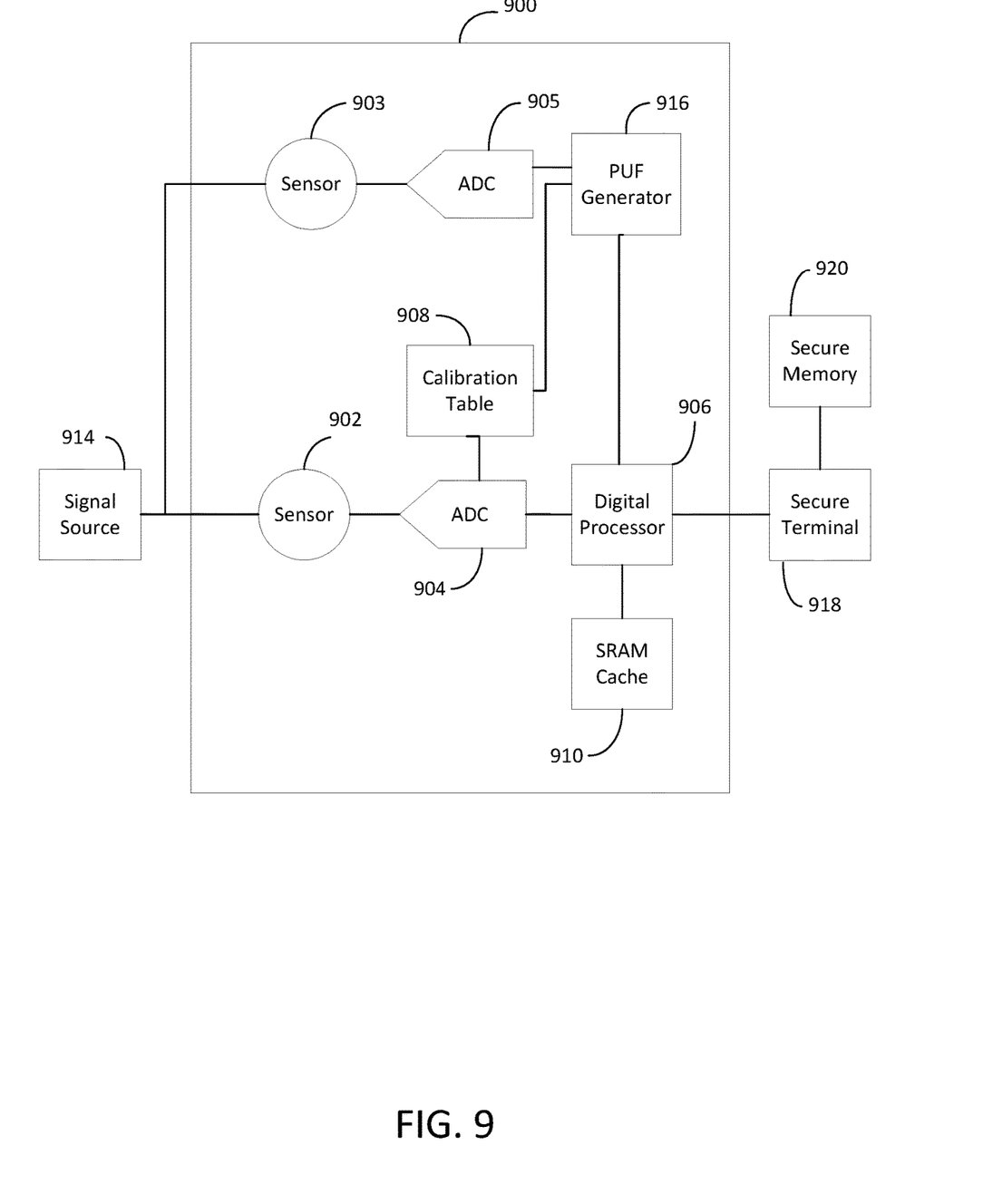
FIG. 9 is a block diagram of an illustrative sensor system with a differential sensor-based PUF generator.

FIG. 9 shows a differential sensor system 900 that can be authenticated using PUF CRPs generated from two differential sensors. Sensor system 900 includes a calibrated sensor 902, an uncalibrated sensor 903, an ADC 904, an ADC 905, a digital processor 906, a calibration table 908 for the calibrated sensor 902, a SRAM cache 910, and a PUF generator 916. If desired, the ADC 904 and the ADC 905 may be combined into a single ADC unit. Secure terminal 918 is connected to differential sensor system 900 and to a secure memory 920. While secure terminal 918 is shown here as being separate from secure memory 920, it should be noted that secure memory 920 may be implemented as part of secure terminal 918 if desired.

Many of the basic attributes and functions of the sensor system 900 have already been described above in connection with sensor system 400 of FIG. 4 and are not repeated here for the sake of brevity.

The sensors 902 and 903 each receive and process the same detectable (e.g., physical or chemical) signals from a signal source 914. Because the sensor 902 is calibrated using the calibration table 908 and the sensor 903 is uncalibrated, the digital sensor signal that is output by the ADC 905 will generally be different from the digital sensor signal output by the ADC 904, at least in instances in which the calibrated sensor signal is different from the uncalibrated sensor signal. The difference between the calibrated digital sensor signal and the uncalibrated digital sensor signal may be represented as a hamming distance, which measures the excursion of the uncalibrated digital sensor signal from the calibrated digital sensor signal.

The PUF verification of system 900 may be defined using streams of binary bits. If the stream resulting from the calibrated sensor 902 is "B":

$$B=\{b_1, b_2, \ldots, b_i, \ldots, b_n\}$$

If the stream resulting from the uncalibrated sensor is "I":

$$I=\{i_1, i_2, \ldots, i_i, \ldots i_n\}$$

The PUF response is given by:

$$R=B\oplus I=\{r_1, r_2, \ldots, r_i, \ldots r_n\}$$

With $\oplus$ being the logical exclusive OR (XOR) function and for $i \in \{1 \text{ to } n\}$:

$$r_i = b_i \oplus i_i$$

The PUF response R may then be compared with the challenge C stored in the secure terminal. C is generated during the initial set up in the same way R is generated and is stored in a secure memory 920. The authentication is positive when the response R and the challenge C match. The match is positive when the hamming distance between R and C is small. The hamming distance, or CRP errors, between C and R is the number of bits at "1" present in the resulting stream $R \oplus C$. The PUF response R is calculated at the PUF generator 916, while the hamming distance is calculated at the secure terminal 918. The sensor system 900 is successfully authenticated when the rate of CRP matches meets or exceeds a predetermined rate, as described in detail below in step 1070 of FIG. 10.

If desired, the sensor system 900 may be implemented with a multi-PUF architecture that relies on the authentication of PUF responses that are generated based on calibration data in the calibration table 908 and/or PUF responses that are generated based on the wakeup state of SRAM cells in the SRAM cache 910. Methods for authenticating such multi-PUF architectures may be similar to those described above in connection with the multi-PUF architectures applicable to the sensor system 400 of FIG. 4. Additionally, any other desired PUF source, such as ring oscillators, gate delays, or non-volatile memories may be incorporated into the multi-PUF authentication process for the sensor system 900.

Figure 10:
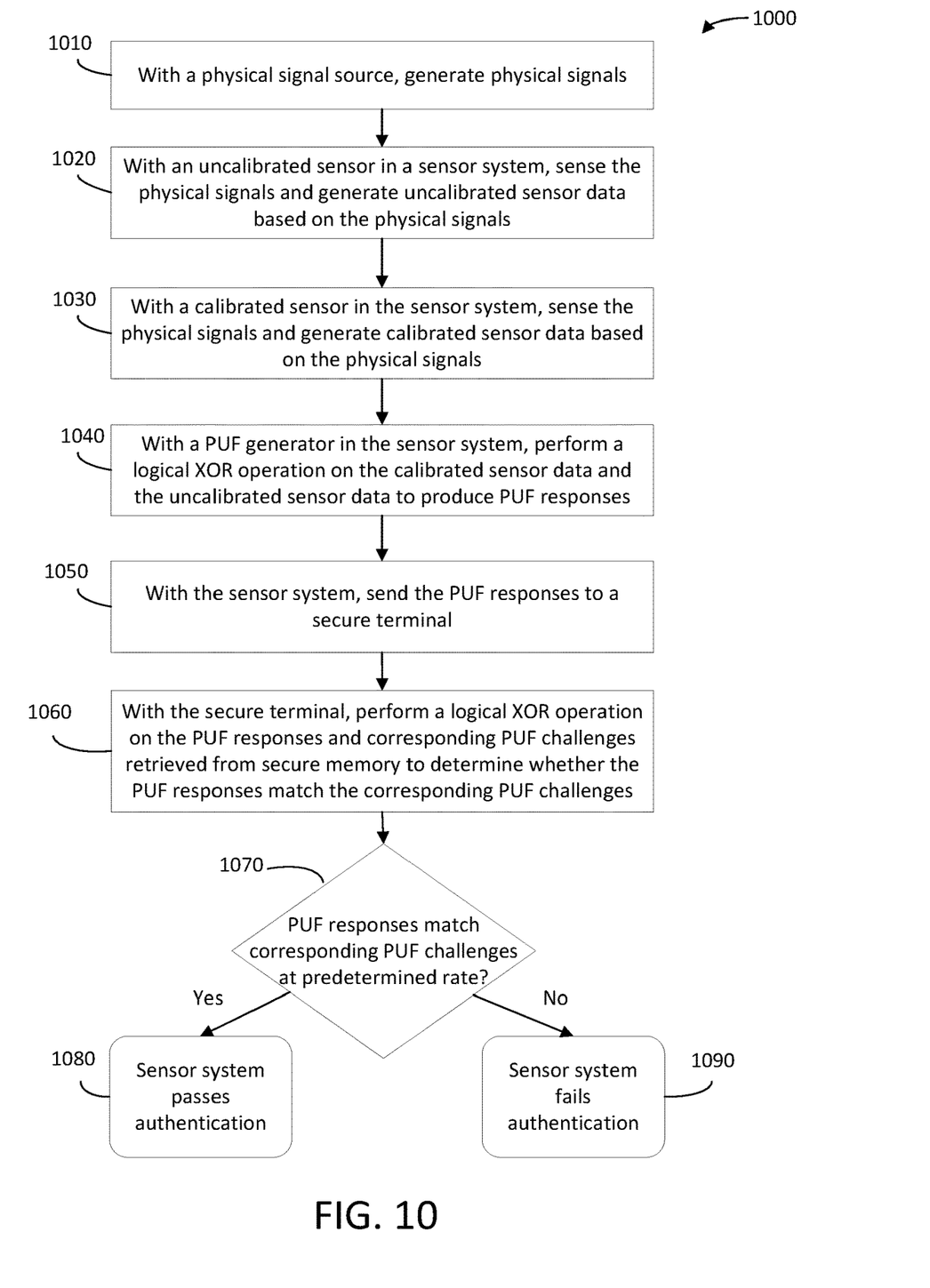
FIG. 10 illustrates a method of PUF challenge-response pair matching for a differential sensor-based PUF generator.

FIG. 10 shows an illustrative method 1000 for performing authentication of a differential sensor system (e.g., differential sensor system 900 shown in FIG. 9). At 1010, a signal source connected to the differential sensor system generates detectable (e.g., physical or chemical) signals.

At 1020, an uncalibrated sensor in the differential sensor system senses the detectable signals and generates uncalibrated sensor data based on the physical signals.

At 1030, a calibrated sensor in the differential sensor system senses the physical signals and generates calibrated sensor data based on the physical signals.

At 1040, a PUF generator in the differential sensor system performs a logical XOR operation on the calibrated sensor data and the uncalibrated sensor data to produce PUF responses.

At 1050, the differential sensor system sends the PUF responses to a secure terminal. In order to hide the PUF responses from potential hackers, a hash function with random numbers may be used to encrypt the transmitted responses.

At 1060, the secure terminal performs a logical XOR operation on the PUF responses and corresponding PUF challenges to determine whether the PUF responses match the corresponding PUF challenges. The PUF challenges are retrieved from secure memory, where the PUF challenges were initially stored during setup of the initial cryptographic protocol of the system.

At 1070, the secure terminal determines whether the PUF responses match the corresponding PUF challenges at a predetermined rate based on, for example, the output of XOR logic gates in the comparator circuitry. This determination may be made by processing circuitry in the secure terminal that compares the number of PUF CRP matches over time to the predetermined matching rate. The predetermined matching rate may be defined during setup of the initial cryptographic protocol of the system.

At 1080, if the PUF responses match the corresponding PUF challenges at or above the predetermined rate, the sensor system passes authentication.

At 1090, if the PUF responses match the corresponding PUF challenges below the predetermined rate, the sensor system fails authentication.

Assuming that both sensors in a closed loop architecture (e.g., the architecture of the sensor system 900 shown in FIG. 9) can operate within their linear region, the hamming distance between them stays constant when the detectable signals are drifting. In such instances, the two sensors are producing drifting electrical signals, however the hamming distance (e.g., offset) between the signals stays constant. So, unlike open loop sensors, differential sensors can operate without known detectable signals. This can enlarge the field of use of the present method. The following examples are presented to better explain closed loop methods in the linear region of operation.

Example #1: Securing the Smart Grid

Uncalibrated current sensors (magnetometers) paired with calibrated sensors can be installed at every node of a grid. The hamming distance between the two output signals responding to a reference current $I_{ref}$ are the challenges and may be stored in the secure server managing the network. To authenticate a particular node, the reference current $I_{ref}$ is sent again to the node and the response to the current sensors is analyzed for CRP matching. This method can authenticate each sensor and conversely can be used at the node level to authenticate the network; in this last case the authentication is done by a secure processor that is part of the node.

Example #2: User Authentication

Each user is given a token that includes a pair of 3D magnetic sensors, and a small wireless communication apparatus. For authentication the user may place the token on a transmitter of a magnetic field of known amplitude that is located at the point of entry of a secure facility. The sensor placed in the token will read the magnetic field and transmit back the response to the transmitter for the CRP analysis which is done by the server of the secure facility. The identification of the user is preferably done with a different method that is synergistic with this authentication.

Example #3: Authentication of Smart Phones

Commercial smart phones incorporate multiple sensors such as accelerometers, gyroscopes, and magnetometers. The insertion of uncalibrated sensors as part of these embedded sensors can continuously generate responses for authentication that are tracking the signal produced by the calibrated sensors. It becomes then possible to authenticate each smart phone by their PUF sensor for the purpose of digital rights management, anti-theft, and software protection.

Example #4: Protection of Medical Devices

Connecting medical devices, such as a pace maker, to a network of medical devices, is potentially desirable, as long as malicious entities are prevented from interacting with the medical devices. For this type of application it is important for the medical devices to authenticate a valid network. Often medical devices have embedded sensors to measure physiological parameters such as blood pressure, heart rate, or blood composition. A differential PUF system based on some of these sensors can block a communication with the network if a proper challenge is not provided during authentication.

The response of most sensors stops being proportional to a received detectable (e.g., physical or chemical) signal when these signals are outside a linear response region, either at very small values, or on the other extreme, at very high values. Sensors functioning in these non-linear response regions are considered to be in a non-linear mode of operation. In the non-linear region both sensors might not track each other and the hamming distance could vary significantly with the magnitude of the detectable signals. This offers opportunities to create stronger cryptographic protocols. One method is to capture several hamming distances for a particular closed loop system measured with different magnitudes of detectable (e.g., physical or chemical) signals. The same sensor system can thereby be described by a set of challenges rather than a single challenge which can strengthen the authentication process considering that multiple responses will be needed. A similar structure can be applied for open loop architectures, multiple known detectable (e.g., physical or chemical) signals are then needed for authentication. The following two examples are presented to better explain how the non-linear operation can be exploited to strengthen the trustworthiness of the system.

Example #5: User Authentication

Reusing the setup described above in example #2, the transmitter may send three known magnetic fields at three different magnitudes. Access is granted if the three responses can match with the corresponding challenges.

Example #6: Protection of Medical Devices

Building on example #4, the differential sensors can be characterized upfront with two levels of blood pressure measurements, to generate two challenges. This can enhance security and reduce false negative authentications.

It should be noted that most sensor systems are full "system-on-chip" (SOC) devices. The percentage of the die area of the SOC that is the sensing element is very small compared with the size of the A/D and digital signal processor. Adding a second sensor to the SOC to provide PUF functionality may have a minor impact on the overall size of the SOC, and thereby only a small impact on the cost structure. For example, the block diagram shown in FIG. 9 can be integrated in a monolithic SOC with die size not much bigger than a SOC with a single sensor.

Streams of data, the PUF challenges and PUF responses are generated from calibration tables that are stored in sensor systems. Each sensor is thereby described by a particular PUF challenge that needs to be matched with the corresponding PUF response during an authentication cycle.

In one embodiment, the PUF generator may exploit the entire calibration table, or a portion of the calibration table, as specifically described by a set of instructions.

In another embodiment, a PUF generator may generate PUF challenges and responses by combining previously described methods together with other PUF generators based on, not to be limited to, other sensor PUFs, embedded SRAMs, non-volatile embedded memories, ring oscillators, or gate delays.

In another embodiment, un-calibrated sensors paired with calibrated sensors may be used to generate PUF parameters. The hamming distances between the two sensors generate the challenges and the responses. Each sensor is described by a particular PUF challenge that needs to be matched with the corresponding PUF response during an authentication cycle.

In another embodiment, the PUF sensors previously described may generate one challenge to be matched with one response, or multiple challenges to be matched with multiple corresponding responses.

In another embodiment, the sensors previously described may be operated in their linear range where the electrical signal produced by the sensor is proportional with the input signal that was produced by a detectable (e.g., physical or chemical) parameter.

In another embodiment, the sensors previously described may be operated in their non-linear range where the electrical signal produced by the sensor is not proportional with the input signal that was produced by a detectable (e.g., physical or chemical) parameter.

In another embodiment, the PUFs based on calibration tables may be combined with the PUFs based on an un-calibrated sensor paired with a calibrated sensor to form a multiple PUF system.

In another embodiment, the sensors previously described may be accelerometers, gyroscopes, magnetometers, image sensors, chemical sensors, biological sensors, medical sensors, and/or pressure sensors.

In another embodiment, the application that incorporate the sensors previously described is related to the smart grid, user authentication and access control, smart phone and terminal authentication, medical device authentication and pace makers, cyber physical systems or the Internet of things.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A system comprising:
a secure terminal having a secure memory that stores PUF challenge data that includes instructions and a set of PUF challenges; and
a sensor system comprising:
  a sensor operable to measure detectable physical or chemical signals and produce corresponding analog electrical signals;
a non-volatile memory storing a sensor calibration table that stores sensor calibration data for the sensor, wherein the sensor calibration data is applied to the output analog electrical signals of the sensor in order to standardize the sensor output signals and to generate sensor output signals that more accurately represent the detectable physical or chemical signals; and
  a physically unclonable function (PUF) generator connected to the sensor calibration table that is configured to:
receive the PUF challenge data from the secure terminal,
extract a set of instructions from the PUF challenge data,
extract at least a portion of the sensor calibration data from the sensor calibration table according to the instructions,
generate a set of PUF responses from the at least a portion of the sensor calibration data retrieved from the sensor calibration table, wherein the PUF challenge data is separate from any detectable physical or chemical signals measured by the sensor and the analog electrical signals;
send the set of PUF responses to the secure terminal, which is configured to:
compare the set of PUF responses at the secure terminal with the set of PUF challenges in the PUF challenge data to determine a degree to which the set of PUF responses and the set of PUF challenges match; and
authenticate the sensor system when the secure terminal determines that the degree to which the set of PUF responses and the set of PUF challenges match is at or above a predetermined threshold.

2. The system of claim 1, wherein the sensor is operable to measure detectable signals selected from a group consisting of physical signals and chemical signals.

3. The system of claim 1, wherein the secure terminal includes comparator circuitry that compares the set of PUF responses to the set of PUF challenges to determine the degree at which the set of PUF responses and the set of PUF challenges match.

4. The system of claim 3, wherein the comparator circuitry comprises exclusive-OR logic gates.

5. The system of claim 3, wherein the sensor system further comprises:
a random access memory (RAM) cache comprising a plurality of RAM cells.

6. The system of claim 5, wherein the PUF generator generates an additional set of PUF responses based on a percentage of the plurality of RAM cells that are in an ON state after powering on the RAM cache.

7. The system of claim 6, wherein the PUF challenge data includes an additional set of PUF challenges, and wherein the comparator circuitry compares the additional set of PUF responses to the additional set of PUF challenges to determine an additional degree at which the additional set of PUF responses and the additional set of PUF challenges match.

8. The system of claim 7, wherein the secure terminal authenticates the sensor system when the secure terminal determines that the degree at which the set of PUF responses and the set of PUF challenges match is at or above a predetermined threshold and that the additional degree at which the additional set of PUF responses and the additional set of PUF challenges match is at or above the predetermined threshold.

9. A method for authenticating a sensor system comprising:
with a secure terminal, issuing physically unclonable function (PUF) challenge data to the sensor system;
with a PUF generator in the sensor system:
extracting a set of instructions from the PUF challenge data,
in accordance with the extracted set of instructions, extracting calibration data from a calibration table in the sensor system, wherein the calibration data is applied to output analog electrical signals of a sensor of the sensor system in order to standardize the sensor output signals and to generate sensor signals that more accurately represent detectable physical or chemical signals sensed by the sensor and any detectable physical or chemical signals measured by the sensor are separate from the PUF challenge data,
generating PUF responses from the calibration data;
with the PUF generator, sending the PUF responses to the secure terminal;
with the secure terminal, comparing the PUF responses with corresponding PUF challenges in the PUF challenge data to determine a degree to which the PUF responses and the corresponding PUF challenges match;
and authenticate the sensor system when the secure terminal determines that the degree to which the PUF responses and the corresponding PUF challenges match is at or above a predetermined threshold.

10. The method of claim 9, wherein comparing the PUF responses with the corresponding PUF challenges in the PUF challenge data to determine the degree at which the PUF responses and the corresponding PUF challenges match further comprises:

with exclusive-OR (XOR) logic in comparator circuitry in the secure terminal, comparing the PUF responses with the corresponding PUF challenges in the PUF challenge data by performing XOR logic operations on the PUF responses and the corresponding PUF challenges to determine the degree at which the PUF responses and the corresponding PUF challenges match.

11. The method of claim 9, further comprising:

with the PUF generator, generating additional PUF responses based on a percentage of random access memory (RAM) cells in a RAM cache that are in an ON state when the RAM cache is powered on;

with the secure terminal, comparing the additional PUF responses with corresponding additional PUF challenges in the PUF challenge data to determine an additional degree at which the PUF responses and the corresponding PUF challenges match; and with the secure terminal, authenticating the sensor system when the degree at which the PUF responses and the corresponding PUF challenges match and the additional degree at which the PUF responses and the corresponding PUF challenges match are each at or above a predetermined threshold.

12. The method of claim 9, wherein the calibration data stored in the calibration table is usable to enhance the linearity of the response of the sensor.

13. The method of claim 9, wherein the calibration data stored in the calibration table is usable to ensure uniformity of sensor performance.

* * * * *